United States Patent
Shimazaki et al.

(10) Patent No.: US 8,848,365 B2
(45) Date of Patent: Sep. 30, 2014

(54) ELECTRONIC DEVICE

(75) Inventors: Shun Shimazaki, Osaka (JP); Hitoshi Nakatani, Osaka (JP); Takeshi Mori, Osaka (JP); Yuichiro Tachibana, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 160 days.

(21) Appl. No.: 13/451,559

(22) Filed: Apr. 20, 2012

(65) Prior Publication Data

US 2012/0268872 A1 Oct. 25, 2012

(30) Foreign Application Priority Data

Apr. 22, 2011 (JP) ................................. 2011-096282
Apr. 13, 2012 (JP) ................................. 2012-092231

(51) Int. Cl.

| | |
|---|---|
| H05K 5/00 | (2006.01) |
| H05K 7/00 | (2006.01) |
| G11B 33/02 | (2006.01) |
| A47G 1/10 | (2006.01) |
| E04G 3/00 | (2006.01) |
| A47B 96/06 | (2006.01) |
| E05C 5/02 | (2006.01) |
| G06F 1/18 | (2006.01) |
| G06F 1/16 | (2006.01) |

(52) U.S. Cl.
CPC ............ G06F 1/1658 (2013.01); G06F 1/187 (2013.01)
USPC ............ 361/679.55; 361/679.32; 361/679.33; 361/679.34; 361/679.35; 361/679.36; 361/679.37; 361/679.39; 361/679.57; 361/679.58; 361/679.59; 369/75.21; 248/316.5; 248/292.14; 248/229.22; 292/8; 292/4; 292/341.17; 74/142

(58) Field of Classification Search
USPC ................. 361/679.31–679.4, 679.55–679.6, 361/724–727; 439/60, 151–160, 327, 328, 439/331, 638; 248/80–88, 155.1–155.5, 248/166–173, 180.1–186.2, 229.1–231.51, 248/271.4, 292.14, 316.1–316.8; 74/141–169, 380–387; 292/1–62, 113, 292/169.11–169.23, 341.11–341.19
See application file for complete search history.

(56) References Cited

U.S. PATENT DOCUMENTS

| | | | | |
|---|---|---|---|---|
| 5,572,402 | A | * | 11/1996 | Jeong ........................ 361/679.31 |
| 6,798,650 | B2 | * | 9/2004 | Reznikov et al. ......... 361/679.33 |
| 2009/0279250 | A1 | * | 11/2009 | Li ............................. 361/679.58 |
| 2011/0085293 | A1 | * | 4/2011 | Muramatsu ............... 361/679.34 |

FOREIGN PATENT DOCUMENTS

JP      H04-324185 A      11/1992

* cited by examiner

*Primary Examiner* — Jerry Wu
(74) *Attorney, Agent, or Firm* — James W. Judge

(57) ABSTRACT

An electronic device in which a holding member for holding an external instrument is arranged rotatably on a housing section, and a restricting part for restricting, at a predetermined angle, rotation angle of the holding member is formed on an inner wall of the housing section. The holding member makes contact with a front side surface engaged with a connector of the external instrument. The restricting part restricts rotation of the holding member whose back surface facing the front side surface is exposed from the housing section. When holding member includes a guiding part that guides the external instrument in a direction that detaches it from the housing section when the holding member is further rotated beyond the restriction by the restricting part, the external instrument can be detached from the housing section when the rotation is equal to or larger than a restriction angle defined by the restricting part.

6 Claims, 13 Drawing Sheets

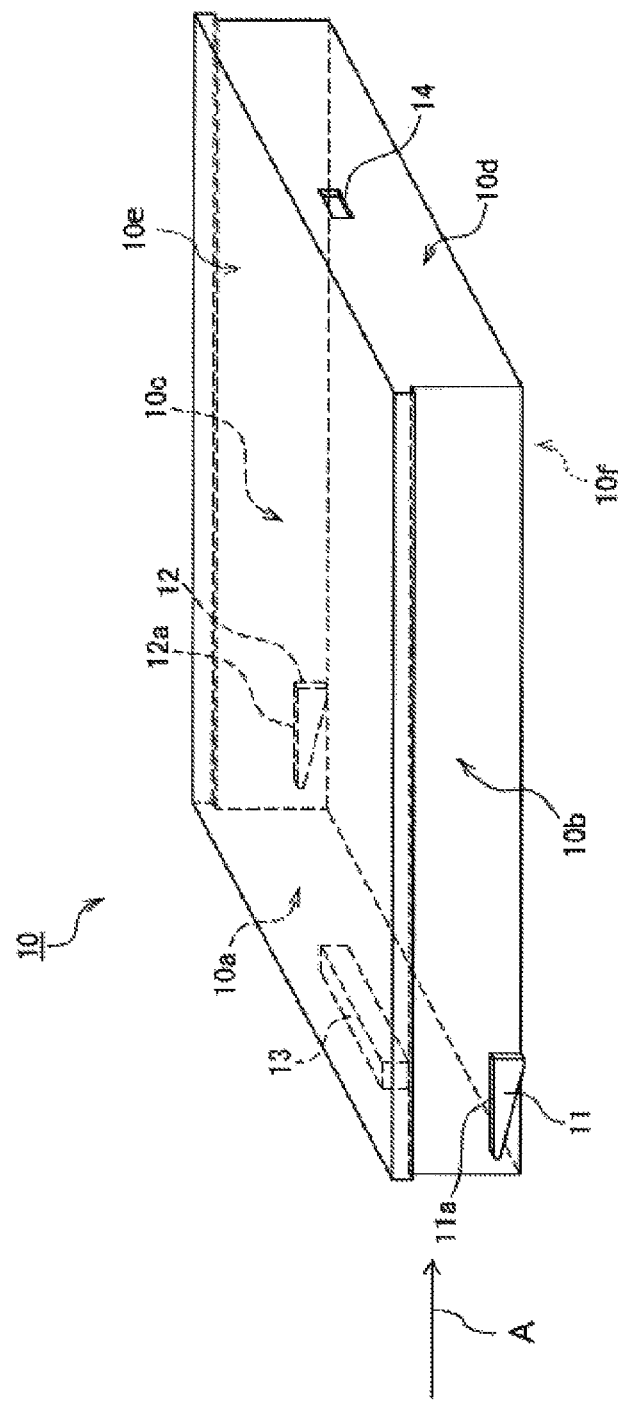

ELECTRONIC DEVICE

BACKGROUND OF THE INVENTION

1. Field of the Invention

The present application relates to electronic devices, in particular, to electronic devices that are used simultaneously with detachable/reattachable-type extension instruments and that include structures for allowing users to properly remove the extension instruments.

2. Description of the Background Art

In recent years, electronic devices such as notebook personal computers and the like often have, on main bodies thereof, configurations allowing detachment/reattachment of extension units. Extension units include, for example, units having built therein hard disk drives.

Japanese Laid-Open Patent Publication No. H04-324185 discloses a portable information processing device allowing detachment and reattachment of a hard disk drive pack on/from a recessed installation part provided on a main body of the device. In this portable information processing device, the hard disk drive pack is inserted into the recessed installation part at a predetermined inclination angle such that one end of the hard disk drive pack makes contact on a wall surface of the recessed installation part, and dropped into the recessed installation part after rotating the hard disk drive pack using a point of the contact as a support point. In order to achieve installation of the hard disk drive pack to the device main body by dropping the hard disk drive pack into the recessed installation part, the disclosed portable information processing device includes a guide protrusion on the hard disk drive pack and a guide groove on the recessed installation part, which face each other.

However, with the configuration disclosed in Japanese Laid-Open Patent Publication No. H04-324185, the hard disk drive pack and the portable information processing device may be damaged when removing the portable information processing device from the hard disk drive pack if a user applies too much force in a detachment direction of the hard disk drive pack.

SUMMARY OF THE INVENTION

An electronic device disclosed in the present application is an electronic device including an extension slot from which an extension unit is detachable/reattachable, and includes a holding member that is arranged rotatably on the extension slot and is operable to hold the extension unit, and a restricting part that is formed within the extension slot and that is configured to restrict rotation of the holding member at a predetermined angle. The holding member is configured to support one lateral surface of the extension unit, and the restricting part is configured to restrict rotation of the holding member at an angle at which another lateral surface facing the one lateral surface of the extension unit is exposed from the extension slot.

With the disclosure of the present application, damage to an extension unit or an equipment main body when the extension unit is being detached can be prevented.

BRIEF DESCRIPTION OF THE DRAWINGS

FIG. 4A is a perspective view of an HDD unit;

DESCRIPTION OF THE PREFERRED EMBODIMENTS

Embodiment 1

[1. Configuration of Electronic Device]

Figure 1:
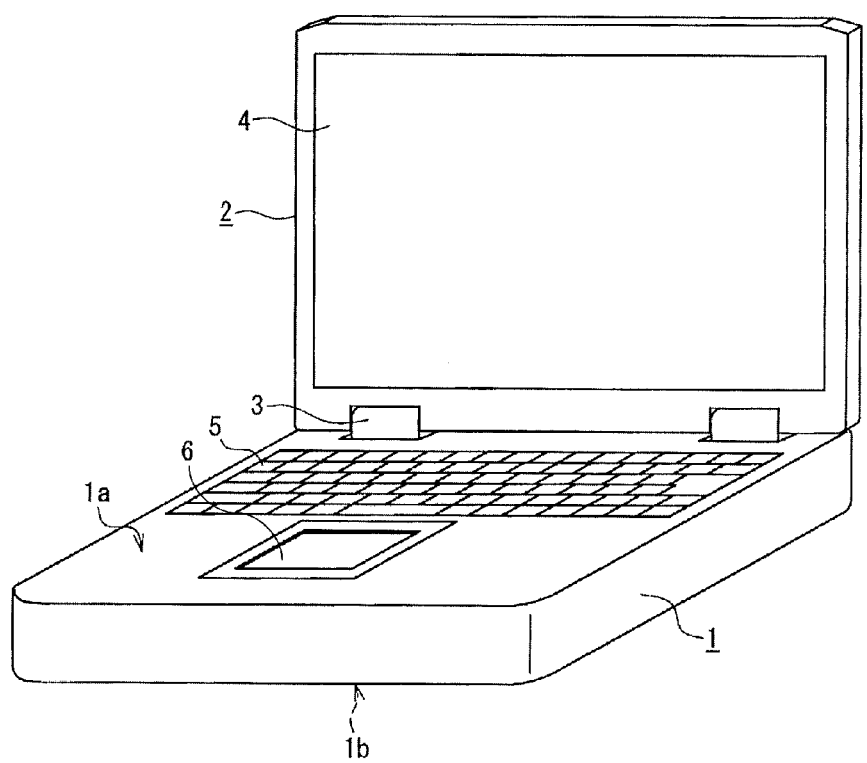
FIG. 1 is a perspective view of a notebook personal computer.

FIG. 1 is a perspective view showing an exterior view of a notebook personal computer according to the present embodiment. The notebook personal computer shown in FIG. 1 is one example of an electronic device. In the present embodiment, although a notebook personal computer in which a first case and a second case are rotatably supported by a hinge section is used as one example of the electronic device, the electronic device may be in any form as long as it includes an extension slot from which an extension unit is detachable/reatachable, and the electronic device may have a single case.

As shown in FIG. 1, the notebook personal computer includes a first case 1 and a second case 2. Components built inside the first case 1 include a circuit board having mounted thereon various electric elements, a processing unit, and the like. The second case 2 includes a display panel 4. The display panel 4 can be achieved by, for example, a liquid crystal display panel. The first case 1 and the second case 2 are supported rotatably to each other by a hinge section 3. The hinge section 3 includes a rotation shaft that supports the first case 1 and the second case 2 rotatably in a direction indicated by arrow A or arrow B. A keyboard 5 and a pointing device 6 are arranged on an upper surface 1a of the first case 1.

Figure 2:
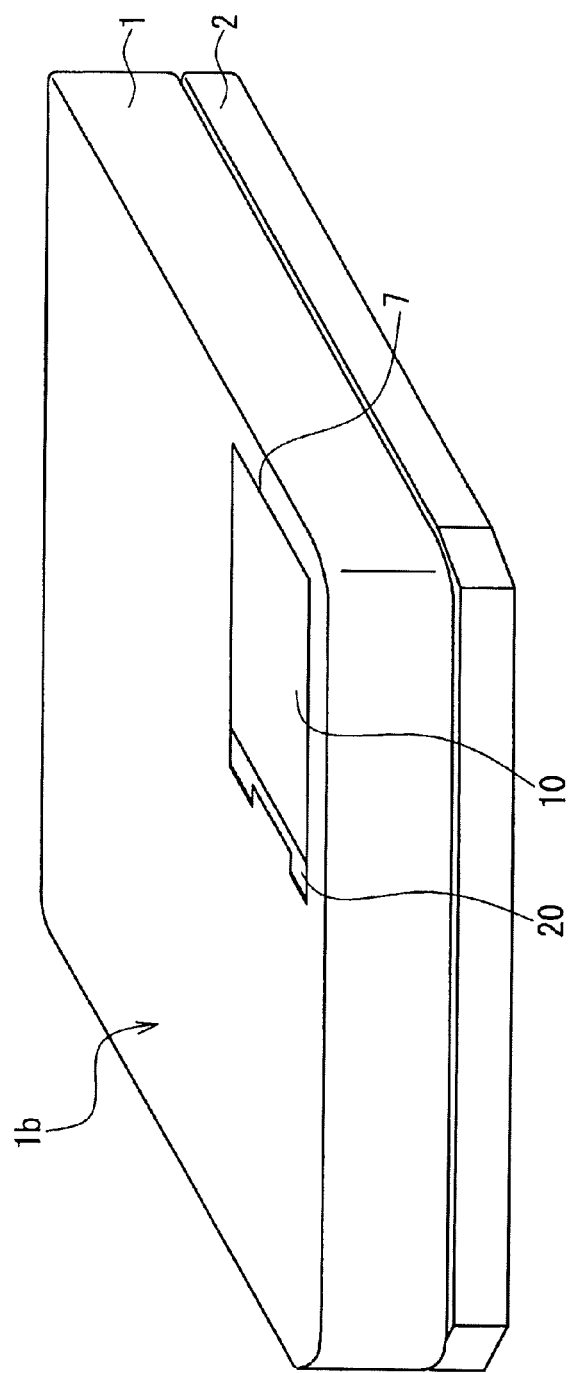
FIG. 2 is a perspective view mainly showing a configuration of a lower surface of the notebook personal computer.

FIG. 2 is a perspective view showing a configuration of the first case 1 on a side of a lower surface 1b. The lower surface 1b of the first case 1 is a surface of a reverse side of the upper surface 1a. An extension slot 7 is included in the lower surface 1b of the first case 1. The extension slot 7 is a slot from which an extension unit is detachable/reatachable (described later). In the extension slot 7 shown in FIG. 2, a hard disk drive unit (hereinafter, HDD unit) 10 which is one example of the extension unit is installed. A connector case 20 is arranged on the extension slot 7. Detailed descriptions of the HDD unit 10 and the connector case 20 are provided later.

Figure 3:
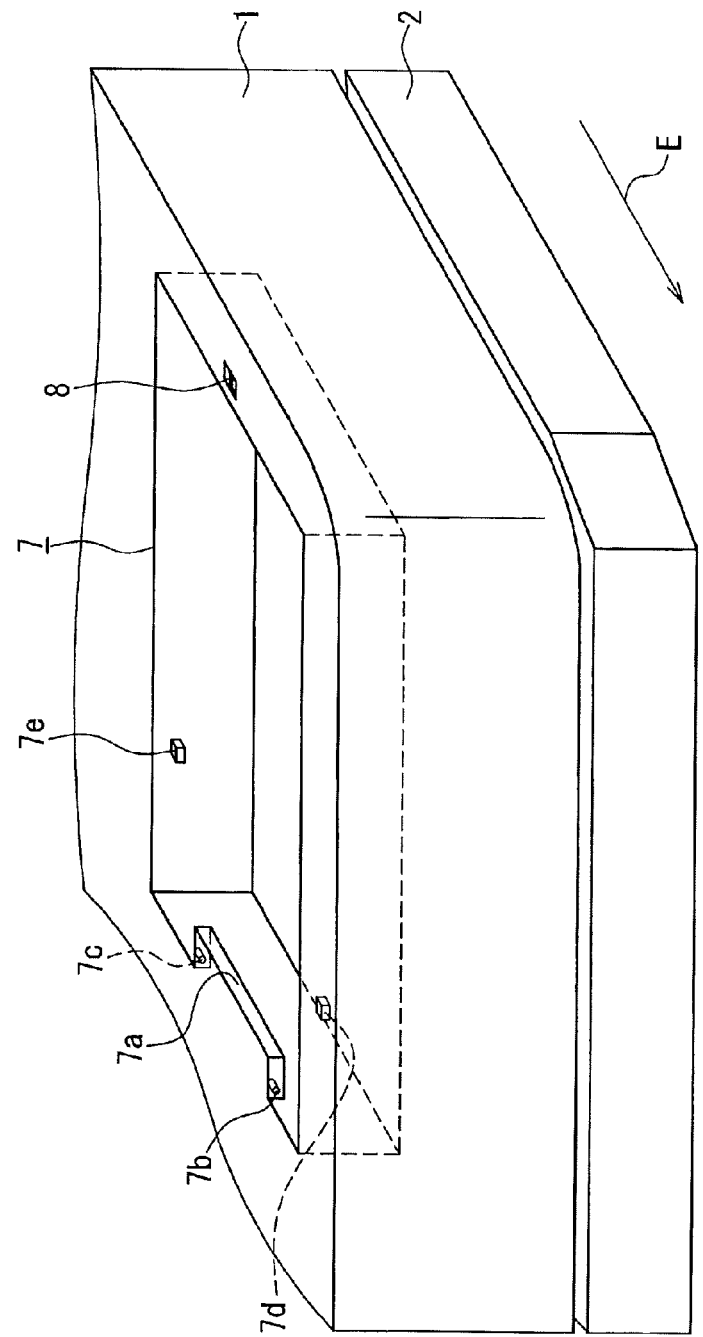
FIG. 3 is fragmentary perspective view of a vicinity of an extension slot of the notebook personal computer.

FIG. 3 is a perspective view of the vicinity of the extension slot 7 of the first case 1. As shown in FIG. 3, the extension slot 7 is in the form of a cavity in the lower surface 1b of the first case 1. The extension slot 7 includes a rib 7a, engagement holes 7b and 7c, and restrictive protruding parts 7d and 7e. The rib 7a is formed so as to project from the lower surface 1b of the first case 1 to an upper part (i.e., a lower surface 1d of the first case 1) of the extension slot 7 in a direction toward the cavity space. The engagement holes 7b and 7c are formed on one pair of side end surfaces that face each other on the rib 7a. The engagement holes 7b and 7c rotatably support the connector case 20. The restrictive protruding parts 7d and 7e are each formed on one pair of inner walls that face each other in the extension slot 7. The restrictive protruding parts 7d and 7e can restrict rotation of the connector case 20. A lock releasing lever 8 is arranged in a vicinity of an edge of the extension slot 7 facing the rib 7a on the lower surface 1b of the first case 1 via the concaved space. The lock releasing lever 8 is arranged so as to be slidable in a direction indicated by arrow E. The lock releasing lever 8 is connected to a claw part (not shown) projecting in an inner wall of the extension slot 7, and can move the claw part (not shown) when being slid in in the direction indicated by arrow E or an opposite direction thereof. The claw part can engage the HDD unit 10.

It should be noted that certain strength is required for the restrictive protruding parts 7d and 7e to prevent them from easily breaking, since they are protrusions for restricting rotation of the connector case 20. In the present embodiment, the inner walls of the extension slot 7 are formed from sheet metal which is made from metal, and the restrictive protruding parts 7d and 7e are formed by bending one portion of the sheet metal, and thereby strength is ensured. It should be noted that the configuration of the restrictive protruding parts 7d and 7e in the present embodiment is not limited as long as strength can be ensured.

[2. Configurations of HDD Unit and Connector Case]

Figure 4B:
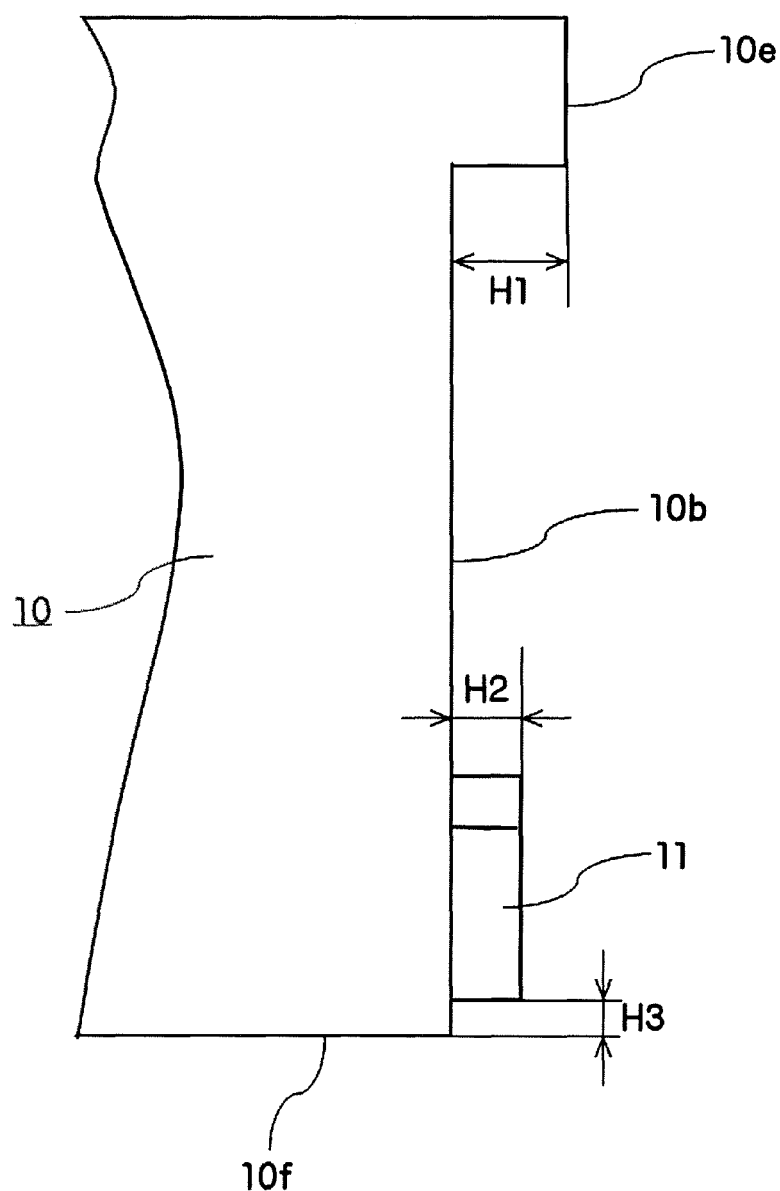
FIG. 4B is a relevant portion enlarged plan view of the HDD unit.

FIG. 4A is a perspective view of the HDD unit 10, and FIG. 4B is a relevant portion enlarged plan view of the HDD unit 10 viewing FIG. 4A in a direction indicated by arrow A. The HDD unit 10 includes a case formed in an approximately rectangular parallelepiped, and an HDD (not shown) built in the case. The HDD unit 10 includes a guide rib 11, a guide rib 12, a connector 13, and an engagement hole 14.

The guide rib 11 is formed on one lateral surface (right side in a view-plane through the side where the connector 13 is) 10b among one pair of lateral surfaces of the HDD unit 10. The guide rib 11 is formed so as to project out from the lateral surface 10b. The guide rib 11 is formed in an approximately triangular shape allowing to be engaged in between a jaw part 21a of and a groove 21d in the connector case 20.

The guide rib 12 is formed on a lateral surface (left side in a view-plane through the side where the connector 13 is) 10c that faces the lateral surface 10b among the one pair of the lateral surfaces of the HDD unit 10. The guide rib 12 is formed so as to project out from the lateral surface 10c. The guide rib 12 is formed in an approximately triangular shape allowing it to be engaged in between a jaw part 22a and a groove 22d in the connector case 20.

End surfaces 11a and 12a of the guide ribs 11 and 12 are parallel to a covering part 10e and a reverse surface 10f of the HDD unit 10, and are arranged to be parallel to the lower surface 1b of the first case 1 in a state where the HDD unit 10 is installed in the extension slot 7.

When the edges 11a and 12a are arranged to be parallel to the covering part 10e or the reverse surface 10f of the HDD unit 10, a user can fundamentally and easily comprehend attachment and detachment directions of the HDD unit 10. This is because the user can hold and detach the HDD unit 10 by holding the covering part 10e or the reverse surface 10f, and can interpret a direction thereof as a pull out direction.

Furthermore, connection and disconnection of the HDD unit 10 and the connector case 20 can be easily conducted by forming the shapes of the guide ribs 11 and 12 so as to be in angular, i.e., tapered, form on the connector case 20 side.

Among the lateral surfaces of the HDD unit 10, the connector 13 is arranged on a front surface 10a that is adjacent to the lateral surface 10b and the lateral surface 10c. The connector 13 includes an electrically conductible contact point, and can electrically connect with a connector 31 (describe later) included in the first case 1.

Among the lateral surfaces of the HDD unit 10, the engagement hole 14 is formed on a back surface 10d which is a surface facing the front surface 10a. The engagement hole 14 can engage the claw part (not shown) projecting in the internal surface of the extension slot 7.

Furthermore, the HDD unit 10 includes the covering part 10e that closes one the end of a space formed by the front surface 10a, the pair of lateral surfaces 10b and 10c, and the back surface 10d. The reverse side of the covering part 10e is the reverse surface 10f. It should be noted that, although a configuration in which the HDD (not shown) is covered by a box is used for the HDD unit 10 of the present embodiment, the HDD may be used by itself. As shown in FIG. 4B, the covering part 10e is formed so as to project out from the lateral surface 10c in a direction of the lateral surface 10b by a length H1 from the lateral surface 10b. In addition, the covering part 10e is formed so as to project out from the lateral surface 10b in a direction of the lateral surface 10c by the length H1 from the lateral surface 10c; however, diagrammatic representation thereof is omitted. The length H1 has a length equal to or larger than H2 (H1≥H2) which is a height of projection of the guide ribs 11 and 12 included in the pair of lateral surfaces 10b and 10c.

Figure 5A:
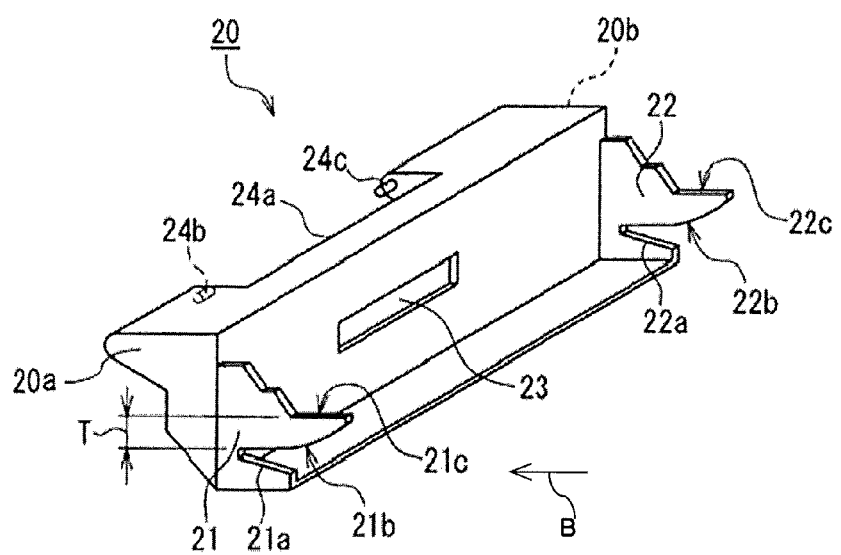
FIG. 5A is a perspective view of a connector case.
Figure 5B:
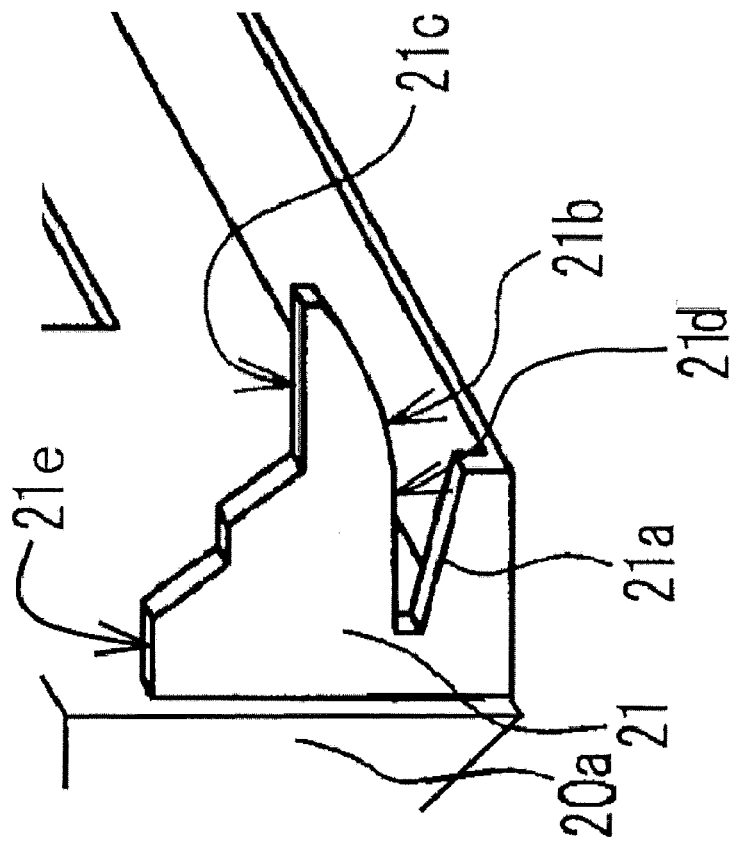
FIG. 5B is a relevant portion enlarged view of FIG. 5A.
Figure 5C:
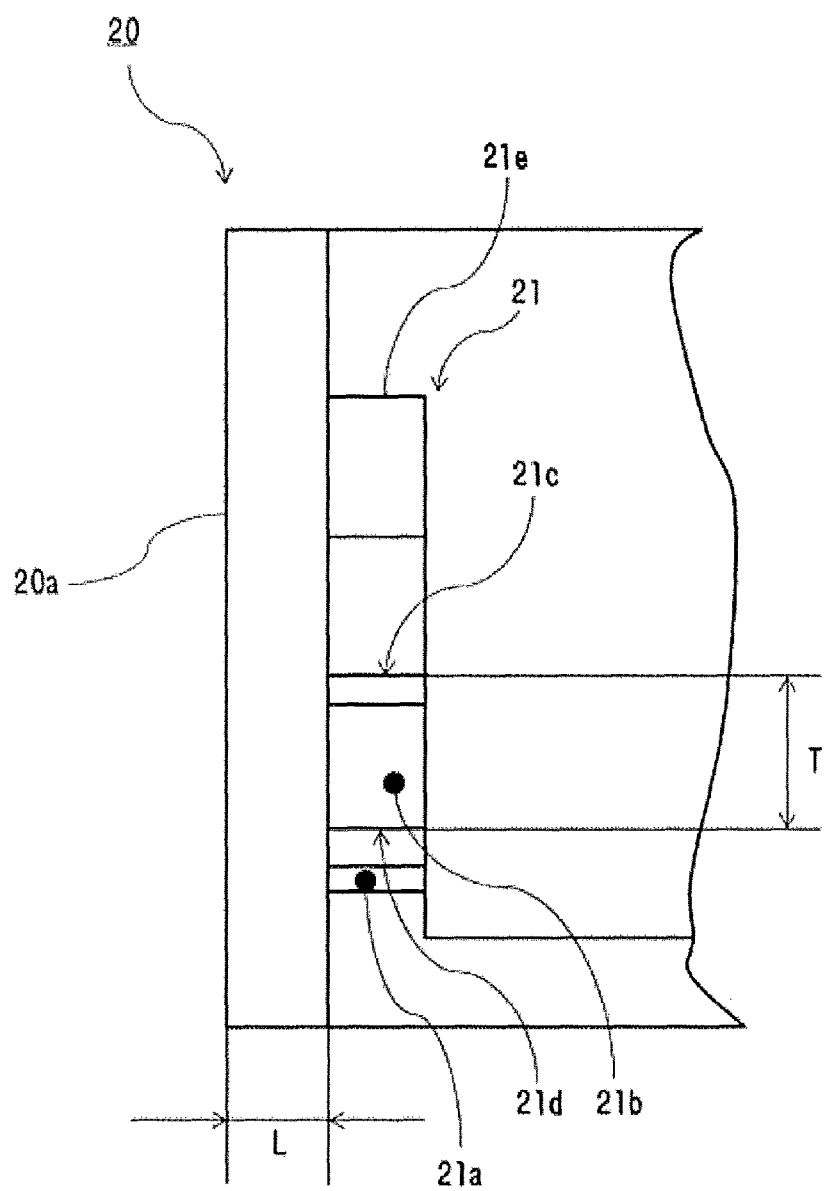
FIG. 5C is a relevant portion enlarged plan view of the connector case.

FIG. 5A is a perspective view of the connector case 20; FIG. 5B is a principal part enlarged perspective view of the connector case 20; and FIG. 5C is a relevant portion enlarged plan view of the connector case 20 when viewed from a direction indicated by arrow B in FIG. 5A. The connector case 20 is a member for holding the connector 31 (described later) included in the first case 1. The connector case 20 includes one pair of support parts 21 and 22, an opening 23, a concaved part 24a, a support shaft 24b, and a support shaft 24c. The support parts 21 and 22 can support the HDD unit 10. The support part 21 includes the jaw part 21a, an inclined part 21b, a contact part 21c, and the groove 21d. The support part 22 includes the jaw part 22a, an inclined part 22b, a contact part 22c, and the groove 22d.

A shape of approximately a V letter is formed between the jaw part 21a and the groove 21d, and between the jaw part 22a and the groove 22d. The guide rib 11 formed on the HDD unit 10 can be inserted between the jaw part 21a and the groove 21d. The guide rib 12 formed on the HDD unit 10 can be inserted between the jaw part 22a and the groove 22d. The opening 23 is a penetration hole for exposing the connector 31 to a side of the HDD unit 10. The rib 7a (cf. FIG. 3) included in the extension slot 7 loosely fits into the concaved part 24a. The concaved part 24a includes, on one pair of mutually opposing internal surfaces thereof, the support shafts 24b and 24c. The support shafts 24b and 24c loosely fit into the engagement holes 7b and 7c in a rotatable manner. The contact parts 21c and 22c are formed in the vicinity of the grooves 21d and 22d. The contact parts 21c and 22c can restrict rotation of the connector case 20 at a predetermined rotation position by making contact with the restrictive protruding parts 7d and 7e.

Furthermore, as shown in FIG. 5C, the support part 21 is formed as being shifted from a lateral surface 20a of the connector case 20 by a length L towards a side of a lateral surface 20b. In addition, the support member 22 is formed as being shifted from the lateral surface 20b of the connector case 20 by the length L towards a side of the lateral surface 20a; however, diagrammatic representation thereof is omitted. The length L is equal to or larger than a height H2 of the guide rib 11 from the lateral surface 10b of the HDD unit 10 and the height H2 of the guide rib 12 from the lateral surface 10c (L≥H2).

Figure 6:
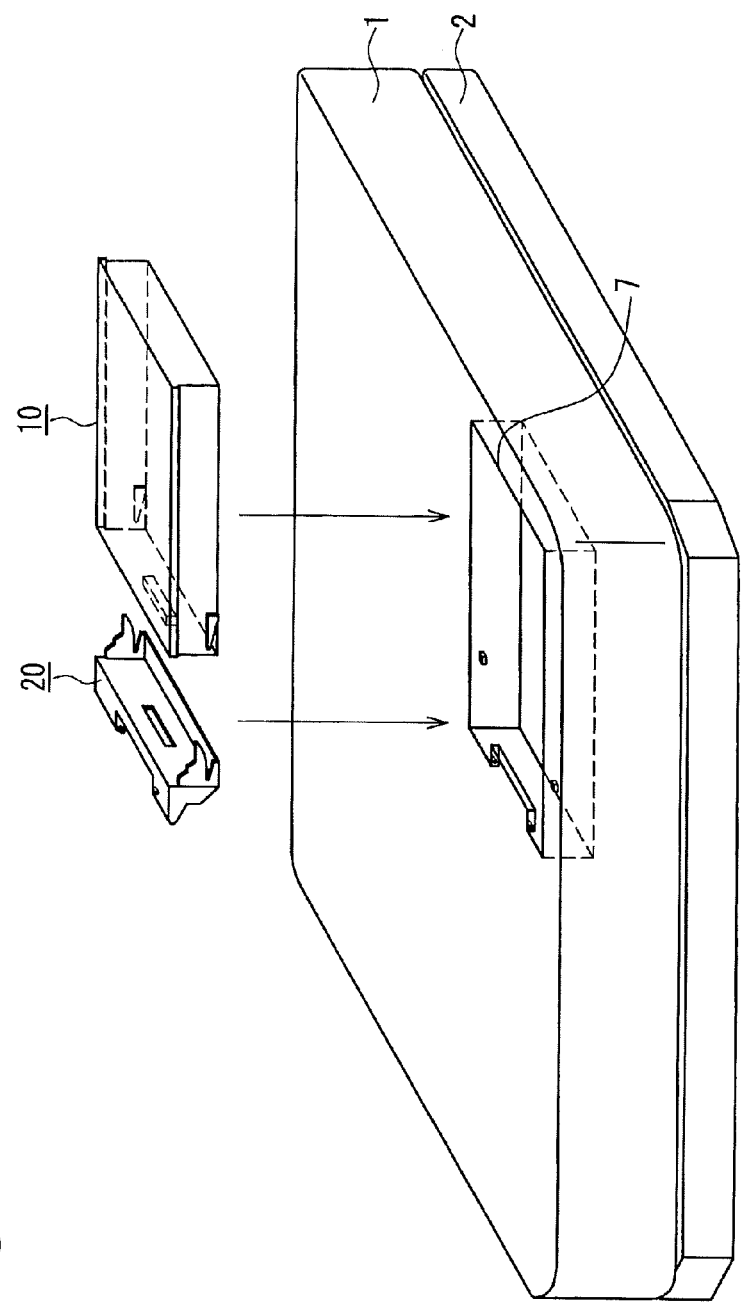
FIG. 6 is a perspective view of the notebook personal computer, the HDD unit, and the connector case.

FIG. 6 is an exploded perspective view of the first case 1, the HDD unit 10, and the connector case 20. The connector case 20 can be held by the first case 1 when the support shaft 24b (cf. FIG. 5A) is loosely fitted in an engagement hole 7b (cf. FIG. 3) and the support shaft 24c (cf. FIG. 5A) is loosely fitted in an engagement hole 7c (cf. FIG. 3). The connector case 20 held by the first case 1 can be rotated utilizing the support shafts 24b and 24c (cf. FIG. 5A) as an axis.

The HDD unit 10 can be held by the connector case 20 when the guide rib 11 (cf. FIG. 4A) is inserted in a gap (cf. FIG. 5B) between the jaw part 21a and the groove 21d of the connector case 20, and when the guide rib 12 (cf. FIG. 4A) is inserted in a gap between the jaw part 22a and the groove 22d of the connector case 20 (similar to the configuration in FIG. 5B). When the HDD unit 10 is held by the connector case 20, the connector 13 (cf. FIG. 4A) penetrates through the opening 23 of the connector case 20 and is electrically connected to the connector 31 (described later) included in the first case 1.

Furthermore, position of the HDD unit 10 in the extension slot 10 is determined when the claw part (not shown) included in the extension slot 7 of the first case 1 engages the engagement hole 14 (cf. FIG. 4A).

[3. Method for Attaching and Detaching HDD Unit]

FIG. 7A to FIG. 7D are cross sectional views showing a process in which the HDD unit 20 is removed from the extension slot 7.

When removing the HDD unit 20 from the extension slot 7, first, the claw part (not shown) that is engaging the engagement hole 14 is detached from the engagement hole 14 (cf. FIG. 4A). When detaching the claw part from the engagement hole 14, the lock releasing lever 8 (cf. FIG. 3) included in the vicinity of the extension slot 7 of the first case 1 is slid in a direction indicated by arrow E. As a result, the claw part connected to the lock releasing lever 8 can be moved to a position for detachment from the engagement hole 14, and thereby the claw part can be detached from the engagement hole 14.

Figure 7A:
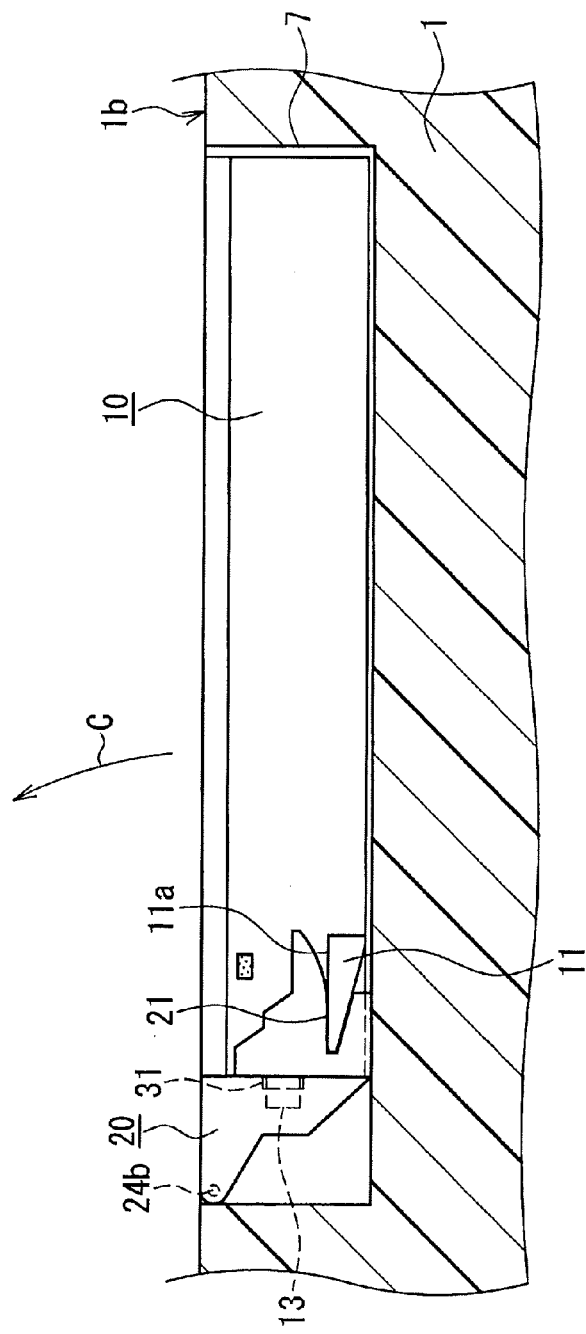
FIG. 7A is a cross sectional view showing a process in which the HDD unit is removed from the extension slot.

Next, as shown in FIG. 7A, the HDD unit 10 is moved in a direction indicated by arrow C. Since the HDD unit 10 is held by the connector case 20, it rotates together with the connector case 20 in a direction indicated by arrow C utilizing the support shafts 24b and 24c as an axis.

Figure 7B:
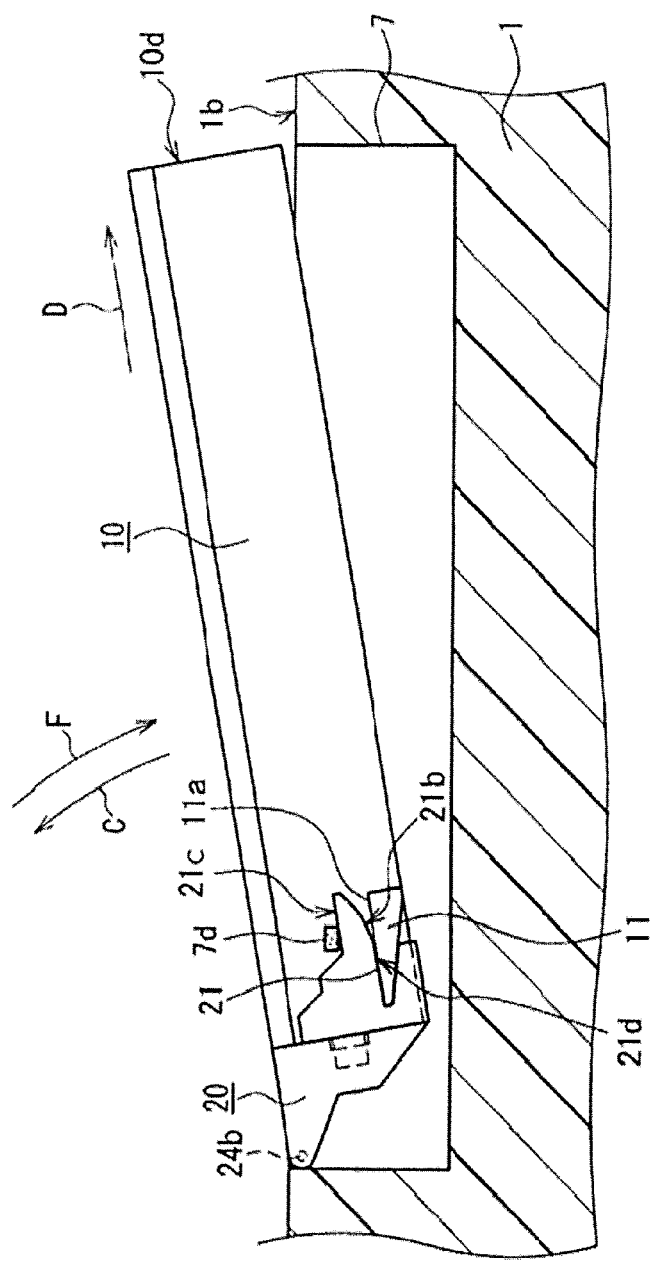
FIG. 7B is a cross sectional view showing the process in which the HDD unit is removed from the extension slot.

When the HDD unit 10 and the connector case 20 are rotated to a position shown in FIG. 7B, the contact part 21c makes contact with a restrictive protruding part 7d, and the contact part 22c makes contact with a restrictive protruding part 7e. As a result, the connector case 20 is restricted from being rotationally moved in the direction indicated by arrow C. When the HDD unit 10 is located at a position shown in FIG. 7B, the back surface 10d side of the HDD unit 10 is detached from the extension slot 7, and the reverse surface 10f (cf. FIG. 4A) becomes exposed from the lower surface 1b of the first case 1. Thus, the HDD unit 10 can be detached from the connector case 20 when being moved in a direction indicated by arrow D.

Figure 7C:
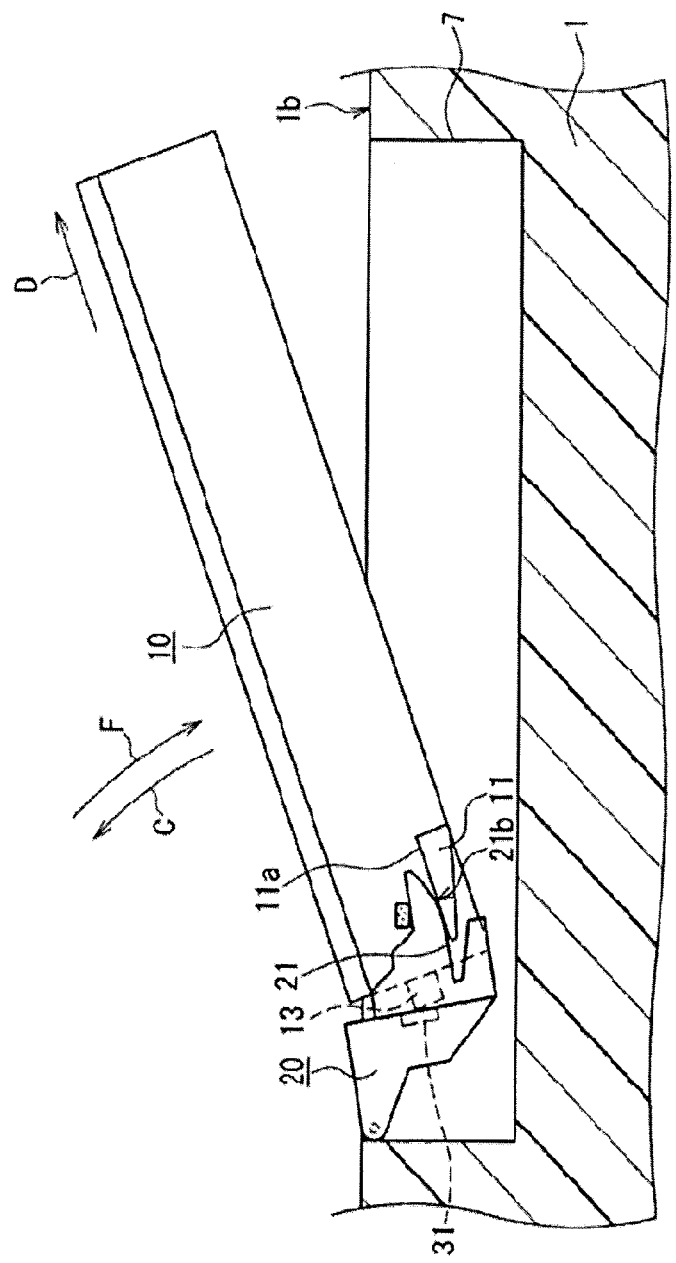
FIG. 7C is a cross sectional view showing the process in which the HDD unit is removed from the extension slot.

However, there are cases where the user mistakenly attempts to further move the HDD unit 10 from the position shown in FIG. 7B in a direction indicated by arrow C. When the HDD unit 10 is to be moved in the direction indicated by arrow C from the position shown in FIG. 7B, the end surface 11a of the guide rib 11 slides along the inclined part 21b, and the end surface 12a of the guide rib 12 slides along the inclined part 22b. As a result, as shown in FIG. 7C, the HDD unit 10 moves in the direction indicated by arrow C, while slightly moving in a direction indicated by arrow D. Thus, the inclined part 21b has an inclination that follows a contour shape of the groove 21d on a side of the guide rib 11a in association with a rotation of the HDD unit 10 in the arrow C direction, causing an interval between the groove 21b and the jaw part 21a to continuously widen. The inclined part 21b causes the gap between the groove 21b and the jaw part 21a to widen when the HDD unit 10 is moved in the arrow D direction. Specifically, the inclined part 21b has an approximately circular arc shape. An inclination shape of the inclined part 21b may be formed in a linear shape; however, when the shape is linear and if planar contact is formed, the detachment will be performed in a linear direction. On the other hand, by having the inclination shape formed in an approximately circular arc shape, the HDD unit 10 is detached while a contact part that forms a linear contact follows a trace of a circumference, and thereby user can easily detach the HDD unit 10. Furthermore, since the HDD unit 10 and the inclined part 21b form a linear contact instead of a planar contact, excessive load is not applied to the connector case 20. In addition, the inclined part 22b has an inclination that follows a contour shape of the groove 22d on a side of the guide rib 12a in association with a rotation of the HDD unit 10 in the arrow C direction, causing an interval between the groove 22b and the jaw part 22a to continuously widen. The inclined part 22b causes the gap between the groove 22b and the jaw part 22a to widen when the HDD unit 10 is moved in the arrow D direction. With this configuration, the guide rib 11a and the inclined part 21b forms a linear contact, and a force that acts between the guide rib 11a and the inclined part 21b includes a detachment direction component; and thereby the user can easily detach the HDD unit 10. Furthermore, the same applies between the guide rib 12a and the inclined part 22b. As a result, the guide rib 11 becomes detached from the gap between the jaw part 21a and the groove 21d, and the guide rib 12 becomes detached from the groove 22d. In addition, when the HDD unit 10 is moved in the direction indicated by arrow D, the connector 13 and the connector 31 included in the first case 1 become separated, and electric connection therebetween is cancelled. It should be noted that, even if the HDD unit 10 is moved from the position shown in FIG. 7B to the position shown in FIG. 7C, movement of the connector case 20 is restricted by the restrictive protruding parts 7d and 7e and the position of the connector case 20 does not change.

As shown in FIG. 7C, the HDD unit 10 can be detached from the connector case 20 and can be removed from the extension slot 7 when the engagement of the guide rib 11 with the gap between the jaw part 21a and the groove 21d is released, and when the engagement of the guide rib 12 with the gap between the jaw part 22a and the groove 22d is released.

Figure 7D:
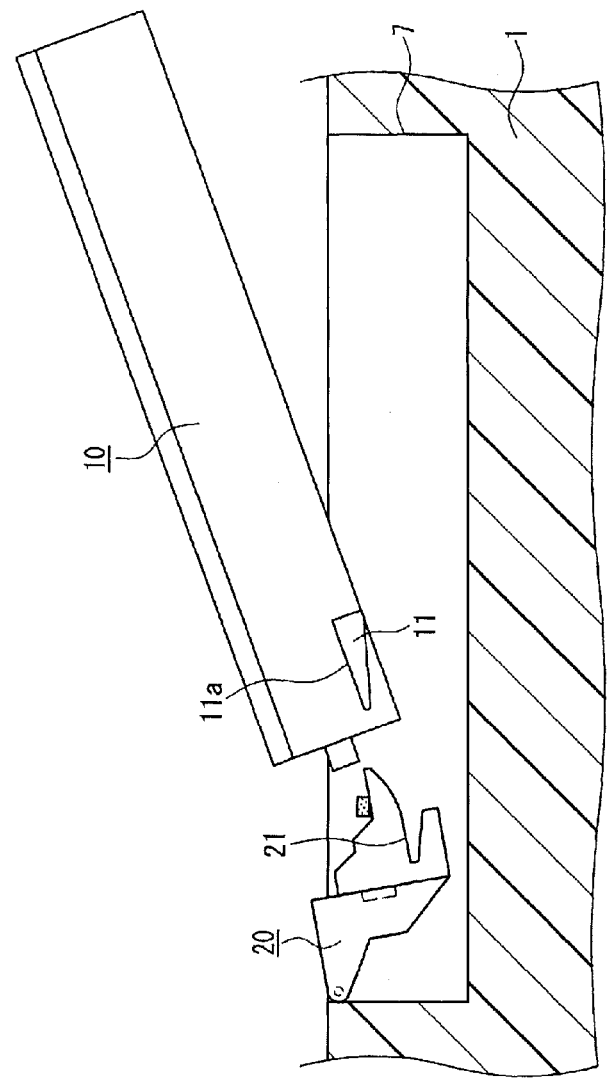
FIG. 7D is a cross sectional view showing the process in which the HDD unit is removed from the extension slot.

On the other hand, when installing the HDD unit 10 into the extension slot 7, the connector case 20 is rotated in a direction indicated by arrow F (cf. FIG. 7C) from a state where the HDD unit 10 and the connector case 20 are separated from each other as shown in FIG. 7D. A preferable rotation angle in this case is an angle at which the contact part 21c makes contact with the restrictive protruding part 7d and the contact part 22c makes contact with the restrictive protruding part 7e.

Next, the HDD unit 10 is installed into the connector case 20 as shown in FIG. 7B. Specifically, the guide rib 11 is inserted between the jaw part 21a and the groove 21d, and the guide rib 12 is inserted between the jaw part 22a and the groove 22d. At this moment, the connector 13 becomes connected to the connector 31 on the notebook personal computer side.

It should be noted that, when installing the HDD unit 10 into the connector case 20, as shown in FIG. 7C, the HDD unit 10 can be moved in the opposite direction of arrow D and rotated in the arrow F direction and can be installed into the connector case 20, while causing the end surface 11a of the guide rib 11 to follow along the inclined part 21b and causing the end surface 12a of the guide rib 12 to follow along the inclined part 22b. As a result of performing the installation in such manner, even when positions of the connector 13 and the connector 31 on the notebook personal computer side are deviated from each other to a certain degree before the HDD unit 10 is installed into the connector case 20, adjustment of positions is performed.

Next, from the state shown in FIG. 7B, the HDD unit 10 is rotated in the direction indicated by arrow F, and the claw part (not shown) connected to the lock releasing lever 8 (cf. FIG. 3) engages the engagement hole 14 of the HDD unit 10.

With the method described above, the HDD unit 10 can be installed in the extension slot 7 as shown in FIG. 7A.

[4. Advantageous Effects of Embodiments, and Others]

With the present embodiment, since rotation of the connector case 20 is restricted by the restrictive protruding parts 7d and 7e, unreasonable force is unlikely to be applied in the direction (cf. FIG. 7A etc.) indicated by arrow C when removing the HDD unit 10, and thereby the support shafts 24b and 24c can be prevented from being detached from the engagement holes 7b and 7c, and the support shafts 24b and 24c can be prevented from breaking.

With the present embodiment, by including the inclined parts 21b and 22b that are gently connected to the surfaces of the grooves 21d and 22d of the connector case 20 and that are configured to widen respective gaps formed with the jaw parts 21a and 22a; the HDD unit 10 detaches from the connector case 20 when the HDD unit 10 and the connector case 20 are rotated to a predetermined position from a state where the HDD unit 10 is installed in the extension slot 7. Therefore, in a case where the user attempts to further rotate the HDD unit 10 from the rotation restriction position (cf. FIG. 7B), the HDD unit 10 is moved slightly in the direction indicated by arrow D through a detachment movement process between the connector 13 of the HDD unit 10 and the connector 31 of the connector case 20, and thereby damages to the connector 13, the connector 31, etc., are prevented.

In the present embodiment, the restrictive protruding parts 7d and 7e are arranged at positions located as close as possible to the support shafts 24b and 24c which become rotation centers, and are formed as surfaces orthogonal with regard to the attachment and detachment directions (e.g., direction indicated by arrow C) of the HDD unit 10, and thereby a thickness T between the groove 21d and the contact part 21c can be increased (the same applies for the thickness between the groove 22d and the contact part 22c). With this, rigidity of the support parts 21 and 22 can be increased, and thereby it is possible to make the support parts 21 and 22 unlikely to break even when force is applied on the HDD unit 10 in the direction indicated by arrow C from the position shown in FIG. 7B.

In the present embodiment, the support members 21 and 22 are formed inside both lateral surfaces of the connector case 20 in order to absorb the thicknesses of the guide ribs 11 and 12 as shown in FIG. 5B; however, the support members 21 and 22 can also be formed so as to conform to both the lateral surfaces 20a and 20b of the connector case 20.

The guide ribs 11 and 12 of the present embodiment are arranged so as to be separated from the reverse surface 10f of the HDD unit 10 by a distance H3 as shown in FIG. 4B; however the size of the distance H3 can be changed as appropriate. It should be noted that the size of the distance H3 has an effect on a rotation moment of the HDD unit 10 about the support shafts 24b and 24c of the connector case 20; and, when H3 is 0, a maximum rotation moment can be obtained and thereby it is preferable.

When the HDD unit 10 according to the present embodiment is installed in the connector case 20, the projection length H1 from the lateral surfaces 10b and 10C of the covering part 10e of the HDD unit 10 makes sliding contact with upper end surfaces 21e (cf. FIG. 5C) and 22e of the support parts 21 and 22. With this configuration, the connector case 20 can achieve the engagement with the HDD unit 10 with certainty. In addition, an extension unit that is vulnerable to moisture, such as the HDD unit 10, can be made watertight by including, although omitted from FIG. 3, a groove whereby the projection length H1 abuts on the surfaces where the lateral surfaces on which the restrictive protruding parts 7d and 7e of the extension slot 7 are arranged come into abutment with the covering part 10e, and by providing, for example, an elastic sealing member along the abutment areas.

It should be noted that, although the support parts 21 and 22 of the connector case 20 of the present embodiment is arranged inside the lateral surfaces 20a and 20b by a displacement of the length L as shown in FIG. 5C, this displacement length L is not necessarily required. When L is 0, the support parts 21 and 22 extend out from the lateral surfaces 20a and 20b. In other words, the lateral surfaces 20a and 20b become the support parts 21 and 22, respectively.

Furthermore, although the support shafts 24b and 24c that rotatably support the connector case 20 of the present embodiment are included on one pair of lateral surfaces that face each other inside the opening 24, the support shafts 24b and 24c may be arranged on the lateral surfaces 20a and 20b of the connector case in outward directions. When such a configuration is employed, the engagement holes 7b and 7c are included on one pair of lateral surfaces of the extension slot 7 corresponding to the lateral surfaces 20a and 20b. Furthermore, in the present embodiment and in the description above, a configuration is used as an example in which the pair of support shafts 24b and 24c are included in a pair of lateral surfaces inside the concaved part 24a, and the engagement holes 7b and 7c are included in both lateral surfaces of the rib 7a. However, this is merely one example and other possible configurations include: a configuration of forming the support shafts on one pair of lateral surfaces of the connector case and forming the engagement holes on the lateral surfaces of the extension slot, which face the lateral surfaces of the connector case; and a configuration in which the positions having the support shafts and the engagement holes are reversed.

It should be noted that, although the HDD unit 10 is used as one example of an external instrument in the present embodiment, the external instrument may be other extension units such as communication units, battery units, and the like.

Furthermore, the HDD unit 10 of the present embodiment is one example of an external instrument. The extension slot 7 of the present embodiment is one example of a housing section. The connector case 20 of the present embodiment is one example of a holding member. The restrictive protruding parts 7d and 7e of the present embodiment are examples of restricting parts. The jaw parts 21a and 22a of the present embodiment are examples of jaw parts. The inclined parts 21b and 22b of the present embodiment are examples of guiding parts. The grooves 21d and 22d of the present embodiment are examples of grooves. The support shafts 24*b* and 24*c* of the present embodiments are examples of rotation shafts.

What is claimed is:

1. An electronic device including a housing section from which an external instrument is reattachably detachable, the electronic device comprising:
    a holding member arranged rotatably on the housing section and functioning to hold the external instrument; and
    a restricting part formed within the housing section and configured to restrict rotation of the holding member at a predetermined angle; wherein:
        the holding member is configured to support a first lateral surface of the external instrument;
        the restricting part is configured to restrict rotation of the holding member at an angle where a second lateral surface of the external instrument, opposing the first lateral surface, is exposed from the housing section;
        the external instrument includes protruding parts on a pair of lateral surfaces adjacent to the first lateral surface and the second lateral surface;
        the holding member includes
            jaw parts and grooves forming gaps through which the protruding parts are inserted when the external instrument is held,
            guiding parts configured to guide the external instrument in a direction in which the protruding parts detach from the jaw parts, and
            contact parts on which the restricting part abuts when the restricting part restricts the rotation of the holding member;
        the jaw parts, the grooves, the guiding parts, and the restricting part are positioned at the pair of lateral surfaces adjacent to the first lateral surface and the second lateral surface of the external instrument when the external instrument is attached to the housing section, and the contact parts are positioned opposite to the guiding parts along a direction in which the holding member rotates; and
        the guiding parts are configured so as when the external instrument is to be further rotated from a position where rotation thereof has been restricted by the restricting part, to guide the external instrument in the direction in which the protruding parts detach from the jaw parts.

2. The electronic device according to claim 1, wherein the protruding parts are configured to make planar contact with the jaw parts, and to make linear contact with the guiding parts.

3. The electronic device according to claim 2, wherein:
    portions of the protruding parts in contact with the jaw parts are formed as flat surfaces;
    portions of the protruding parts in contact with the grooves are formed as flat surfaces; and
    portions of the guiding parts in contact with the protruding parts are formed as curved surfaces.

4. The electronic device according to claim 3, wherein the curved surfaces of the guiding parts are curved in a direction in which the gaps between the grooves and the jaw parts expand.

5. The electronic device according to claim 4, wherein the flat surfaces of the protruding parts for the grooves are parallel to planes defined by the first lateral surface, and by the second lateral surface, and by the pair of lateral surfaces adjacent to the second lateral surface, of the external instrument.

6. The electronic device according to claim 5, wherein the protruding parts are of a form in which they taper in a direction along which the protruding parts are inserted into the gaps between the grooves and the jaw parts.

* * * * *